US009652030B2

(12) United States Patent
Yeung et al.

(10) Patent No.: US 9,652,030 B2
(45) Date of Patent: May 16, 2017

(54) NAVIGATION OF A VIRTUAL PLANE USING A ZONE OF RESTRICTION FOR CANCELING NOISE

(75) Inventors: Brian Yeung, Seattle, WA (US); Anton Andrews, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1238 days.

(21) Appl. No.: 12/363,094

(22) Filed: Jan. 30, 2009

(65) Prior Publication Data

US 2010/0199221 A1 Aug. 5, 2010

(51) Int. Cl.
*G06F 3/01* (2006.01)
*G06K 9/00* (2006.01)
(Continued)

(52) U.S. Cl.
CPC ............ *G06F 3/011* (2013.01); *A63F 13/213* (2014.09); *G06F 3/017* (2013.01); *G06F 3/0346* (2013.01); *G06K 9/00335* (2013.01); *G06K 9/00342* (2013.01); *G06K 9/00355* (2013.01); *G06K 9/00362* (2013.01); *G06K 9/00369* (2013.01); *G06T 19/006* (2013.01)

(58) Field of Classification Search
CPC .......... G06F 3/011–3/014; G06F 3/017; G06F 3/0346; A63B 2024/0025; A63B 2220/806; A63B 2220/807; A63F 2300/64; A63F 2300/105; A63F 2300/1087; A63F 2300/6045; A63F 13/06; A63F 2300/8082; G10H 2220/401; G01B 11/22; G06K 9/00335–9/00355; G06K 9/00362–9/00389; G06K 9/00395; G01S 17/89; G06T 2207/30196; G06T 7/246; G06T 7/248; G06T 7/251; G06T 7/285; G06T 7/292; G06T 19/006
USPC ........................................... 715/863; 345/157
See application file for complete search history.

(56) References Cited

U.S. PATENT DOCUMENTS 4,843,568 A * 6/1989 Krueger et al. ............... 382/100
5,563,988 A * 10/1996 Maes et al. .................... 345/421
(Continued)

FOREIGN PATENT DOCUMENTS

| CN | 201254344 B * | 6/2010 | ............. A63F 13/00 |
| EP | 0583061 A2 * | 2/1994 | ............. G06T 13/20 |

(Continued)

OTHER PUBLICATIONS

Penny, Simon, Jeffrey Smith, and Andre Bernhardt. "Traces: Wireless full body tracking in the cave." ICAT 99 Conference Proceedings. 1999.*

(Continued)

*Primary Examiner* — Eric Wiener
(74) *Attorney, Agent, or Firm* — Baker & Hostetler LLP

(57) ABSTRACT

A touchless human computer interface (HCI) provides a virtual surface in three-dimensional space and a zone of restriction for defining a level of sensitivity to movements in order to cancel noise that may be caused by natural wobble of a human appendage. The touchless HCI may receive input regarding a user movement, process the input to generate clean gesture data and analyze at least one dynamic variable to determine an interpreted action based upon a relationship of the clean gesture data with respect to the virtual surface.

18 Claims, 17 Drawing Sheets

(51) Int. Cl.
  *G06F 3/0346* (2013.01)
  *A63F 13/213* (2014.01)
  *G06T 19/00* (2011.01)

(56) References Cited

U.S. PATENT DOCUMENTS

| | | | |
|---|---|---|---|
| 5,875,108 A * | 2/1999 | Hoffberg | G06F 3/00 382/181 |
| 5,913,727 A * | 6/1999 | Ahdoot | 463/39 |
| 6,057,909 A | 5/2000 | Yahav et al. | |
| 6,100,517 A | 8/2000 | Yahav et al. | |
| 6,141,463 A * | 10/2000 | Covell et al. | 382/286 |
| 6,167,433 A * | 12/2000 | Maples et al. | 709/204 |
| 6,181,343 B1 * | 1/2001 | Lyons | 715/850 |
| 6,222,465 B1 | 4/2001 | Kumar | |
| 6,256,033 B1 | 7/2001 | Nguyen | |
| 6,308,565 B1 * | 10/2001 | French et al. | 73/379.04 |
| 6,414,672 B2 * | 7/2002 | Rekimoto et al. | 345/173 |
| 6,430,997 B1 * | 8/2002 | French et al. | 73/379.04 |
| 6,498,628 B2 | 12/2002 | Iwamura | |
| 6,502,515 B2 | 1/2003 | Burckhardt et al. | |
| 6,512,838 B1 | 1/2003 | Rafii et al. | |
| 6,539,931 B2 | 4/2003 | Trajkovic et al. | |
| 6,554,433 B1 * | 4/2003 | Holler | 353/79 |
| 6,674,877 B1 | 1/2004 | Jojic et al. | |
| 6,677,969 B1 * | 1/2004 | Hongo | 715/863 |
| 6,720,949 B1 * | 4/2004 | Pryor et al. | 345/158 |
| 6,749,432 B2 * | 6/2004 | French et al. | 434/247 |
| 6,765,726 B2 * | 7/2004 | French et al. | 359/630 |
| 6,771,277 B2 | 8/2004 | Ohba | |
| 6,876,496 B2 * | 4/2005 | French et al. | 359/630 |
| 6,890,262 B2 * | 5/2005 | Oishi et al. | 463/31 |
| 6,950,534 B2 | 9/2005 | Cohen et al. | |
| 7,006,236 B2 | 2/2006 | Tomasi et al. | |
| 7,036,094 B1 * | 4/2006 | Cohen et al. | 715/863 |
| 7,042,440 B2 * | 5/2006 | Pryor | A63F 13/02 345/156 |
| 7,050,177 B2 | 5/2006 | Tomasi et al. | |
| 7,058,204 B2 | 6/2006 | Hildreth | |
| 7,151,530 B2 | 12/2006 | Roeber et al. | |
| 7,224,384 B1 | 5/2007 | Iddan et al. | |
| 7,227,526 B2 | 6/2007 | Hildreth et al. | |
| 7,233,316 B2 * | 6/2007 | Smith et al. | 345/157 |
| 7,259,747 B2 * | 8/2007 | Bell | 345/156 |
| 7,293,356 B2 | 11/2007 | Sohn et al. | |
| 7,308,112 B2 | 12/2007 | Fujimura et al. | |
| 7,310,431 B2 | 12/2007 | Gokturk et al. | |
| 7,317,836 B2 | 1/2008 | Fujimura et al. | |
| 7,340,077 B2 | 3/2008 | Gokturk et al. | |
| 7,348,963 B2 * | 3/2008 | Bell | 345/156 |
| 7,359,121 B2 * | 4/2008 | French et al. | 359/630 |
| 7,367,887 B2 | 5/2008 | Watabe et al. | |
| 7,379,563 B2 * | 5/2008 | Shamaie | 382/103 |
| 7,452,275 B2 * | 11/2008 | Kuraishi | 463/30 |
| 7,590,262 B2 | 9/2009 | Fujimura et al. | |
| 7,598,942 B2 * | 10/2009 | Underkoffler et al. | 345/158 |
| 7,646,372 B2 * | 1/2010 | Marks et al. | 345/156 |
| 7,701,439 B2 * | 4/2010 | Hillis et al. | 345/156 |
| 7,755,608 B2 * | 7/2010 | Chang et al. | 345/157 |
| 7,791,808 B2 * | 9/2010 | French et al. | 359/630 |
| 7,854,655 B2 * | 12/2010 | Mao et al. | 463/30 |
| 7,874,917 B2 * | 1/2011 | Marks et al. | 463/36 |
| 7,898,522 B2 * | 3/2011 | Hildreth et al. | 345/156 |
| 2001/0002126 A1 * | 5/2001 | Rosenberg et al. | 345/156 |
| 2001/0040572 A1 * | 11/2001 | Bradski | G06F 3/012 345/419 |
| 2002/0036617 A1 * | 3/2002 | Pryor | 345/156 |
| 2003/0017872 A1 * | 1/2003 | Oishi et al. | 463/33 |
| 2004/0207597 A1 | 10/2004 | Marks | |
| 2004/0215689 A1 * | 10/2004 | Dooley et al. | 709/200 |
| 2005/0059488 A1 | 3/2005 | Larsen et al. | |
| 2005/0088409 A1 * | 4/2005 | Van Berkel | 345/157 |
| 2005/0166163 A1 * | 7/2005 | Chang et al. | 715/863 |
| 2005/0238201 A1 * | 10/2005 | Shamaie | 382/103 |
| 2006/0010400 A1 | 1/2006 | Dehlin | |
| 2006/0094503 A1 * | 5/2006 | Ajioka et al. | 463/32 |
| 2006/0139314 A1 * | 6/2006 | Bell | 345/156 |
| 2006/0187196 A1 * | 8/2006 | Underkoffler et al. | 345/156 |
| 2006/0188144 A1 | 8/2006 | Sasaki et al. | |
| 2006/0210112 A1 * | 9/2006 | Cohen et al. | 382/103 |
| 2006/0211462 A1 * | 9/2006 | French et al. | 463/1 |
| 2006/0239558 A1 | 10/2006 | Rafii et al. | |
| 2007/0013718 A1 | 1/2007 | Ohba | |
| 2007/0060336 A1 | 3/2007 | Marks et al. | |
| 2007/0098222 A1 | 5/2007 | Porter et al. | |
| 2007/0124694 A1 * | 5/2007 | Van De Sluis et al. | 715/775 |
| 2007/0216894 A1 | 9/2007 | Garcia et al. | |
| 2007/0260984 A1 | 11/2007 | Marks et al. | |
| 2007/0279485 A1 | 12/2007 | Ohba et al. | |
| 2007/0283296 A1 | 12/2007 | Nilsson | |
| 2007/0294639 A1 * | 12/2007 | Van Berkel et al. | 715/830 |
| 2007/0298882 A1 | 12/2007 | Marks et al. | |
| 2008/0001951 A1 | 1/2008 | Marks et al. | |
| 2008/0013793 A1 * | 1/2008 | Hillis et al. | 382/114 |
| 2008/0062257 A1 | 3/2008 | Corson | |
| 2008/0100620 A1 | 5/2008 | Nagai et al. | |
| 2008/0111710 A1 * | 5/2008 | Boillot | 341/22 |
| 2008/0117168 A1 * | 5/2008 | Liu et al. | 345/158 |
| 2008/0126937 A1 | 5/2008 | Pachet | |
| 2008/0134102 A1 | 6/2008 | Movold et al. | |
| 2008/0152191 A1 | 6/2008 | Fujimura et al. | |
| 2008/0187178 A1 * | 8/2008 | Shamaie | 382/103 |
| 2008/0214253 A1 * | 9/2008 | Gillo et al. | 463/1 |
| 2008/0215679 A1 * | 9/2008 | Gillo et al. | 709/204 |
| 2008/0215972 A1 | 9/2008 | Zalewski et al. | |
| 2008/0215973 A1 | 9/2008 | Zalewski et al. | |
| 2008/0256494 A1 * | 10/2008 | Greenfield | 715/863 |
| 2009/0017910 A1 * | 1/2009 | Rofougaran et al. | 463/36 |
| 2009/0058850 A1 * | 3/2009 | Fun | 345/419 |
| 2009/0104993 A1 * | 4/2009 | Ye | 463/39 |
| 2009/0141933 A1 | 6/2009 | Wagg | |
| 2009/0167679 A1 | 7/2009 | Klier et al. | |
| 2009/0217211 A1 * | 8/2009 | Hildreth et al. | 715/863 |
| 2009/0221368 A1 | 9/2009 | Yen et al. | |
| 2009/0228841 A1 * | 9/2009 | Hildreth | 715/863 |
| 2010/0041478 A1 * | 2/2010 | Ajioka et al. | 463/32 |
| 2010/0103106 A1 * | 4/2010 | Chui | 345/166 |
| 2010/0111358 A1 * | 5/2010 | Chai et al. | 382/103 |
| 2010/0166258 A1 * | 7/2010 | Chai et al. | 382/103 |
| 2010/0210359 A1 * | 8/2010 | Krzeslo et al. | 463/31 |
| 2010/0222144 A1 * | 9/2010 | Ohba et al. | 463/35 |

FOREIGN PATENT DOCUMENTS

| | | | | |
|---|---|---|---|---|
| IL | WO 9915863 A1 * | 4/1999 | | G01H 9/00 |
| JP | 08044490 A1 * | 2/1996 | | G06F 3/033 |
| JP | 2000163178 A * | 6/2000 | | G06K 9/00 |
| WO | WO 9310708 A1 * | 6/1993 | | A63B 69/0053 |
| WO | WO 9717598 A1 * | 5/1997 | | A63B 24/0003 |
| WO | WO 99/15863 A1 | 4/1999 | | |
| WO | WO 9944698 A1 * | 9/1999 | | A63B 69/00 |
| WO | WO 01/59975 A3 | 1/2002 | | |
| WO | WO 0159975 A3 * | 1/2002 | | |
| WO | WO 02/082249 A2 | 10/2002 | | |
| WO | WO 02082249 A2 * | 10/2002 | | G06F 3/02 |
| WO | WO 03/001722 A3 | 3/2003 | | |
| WO | WO 03001722 A3 * | 3/2003 | | |
| WO | WO 03/046706 A1 | 6/2003 | | |
| WO | WO 03046706 A1 * | 6/2003 | | G06F 3/02 |
| WO | WO 03/071410 A2 * | 8/2003 | | G06F 3/00 |
| WO | WO 03/073359 A3 | 11/2003 | | |
| WO | WO 03073359 A3 * | 11/2003 | | |
| WO | WO 03/054683 A3 | 12/2003 | | |
| WO | WO 03054683 A3 * | 12/2003 | | G06F 3/033 |
| WO | WO 03/071410 A3 | 3/2004 | | |
| WO | WO 2009/059065 A1 | 5/2009 | | |
| WO | WO 2009059065 A1 * | 5/2009 | | G06F 3/017 |

OTHER PUBLICATIONS

MacCormick, John and Blake, Andrew; "A probabilistic exclusion principle for tracking multiple objects;" Computer Vision, 1999. The Proceedings of the Seventh IEEE International Conference on;

(56) References Cited

OTHER PUBLICATIONS pp. 572-578, vol. 1; Sep. 27, 1999; DOI: 10.1109/ICCV.1999.791275.*

S. C. W. Ong and S. Ranganath. "Deciphering Gestures with Layered Meanings and Signer Adaptation." In Proceedings of the 6th IEEE International Conference on Automatic Face and Gesture Recognition, 2004.*

H. Chen, H. Lin, and T. Liu. "Multi-object tracking using dynamical graph matching." In Proc. of the 2001 IEEE Computer Society Conference on Computer Vision and Pattern Recognition, pp. 210-217, 2001.*

Sridhar, Anuraag and Sowmya, Arcot; "Multiple Camera, Multiple Person Tracking with Pointing Gesture Recognition in Immersive Environments;" Advances in Visual Computing, pp. 508-519; 4th International Symposium, ISVC 2008, Las Vegas, NV, USA, Dec. 1-3, 2008. Proceedings, Part 1; DOI: 10.1007/978-3-540-89639-5_49.*

Gabriel, Pierre F.; Verly, Jacques G.; Piater, Justus H.; Genon, Andre; "The state of the art in multiple object tracking under occlusion in video sequences;" In Advanced Concepts for Intelligent Vision Systems (ACIVS), 2003; pp. 166-173; 2003.*

Woo, Woontack; Kim, Namgyu; Wong, Karen; and Tadenuma, Makoto; "Sketch on dynamic gesture tracking and analysis exploiting vision-based 3D interface", Proc. SPIE 4310, Visual Communications and image Processing 2001,656 (Dec. 29, 2000); DOkIO. 1117/12.411844.*

S.J. McKenna, S. Jabri, Z. Duric, H. Wechsler, A. Rosenfeld; "Tracking groups of people;" Computer Vision and Image Understanding, vol. 80; pp. 42-56; 2000.*

Baratoff et al., "Gesture Recognition," downloaded Apr. 7, 2009, http://www,hiti,washinaton.edu/scivw/EVE/!.D,2.b.GestureRecoanition.html, oas. 1-4.*

Bolt, R., "Put-That-There: Voice and Gesture at the Graphics Interface," ACM, http://web.media.mit.edu/Hip/Papers/Arh Mach Refs/Bolt PIT.pdf, 1980, oas. 262-270.*

LaViola Jr., J., "Bringing VR and Spatial 3D Interaction to the Masses through Video Games," IEEE Computer Society, http://www.es.ucf.edu/~iil/Dubs/caa araohic 5 Q8.pdf, Sep./Oct. 2008, pp. 10-15.*

Hinckley et al., "Passive Real-World Interface Props for Neurosurgical Visualization," Human Factors in Computina Systems, http://www.cs.virainia.edu/papers/p452~hincklev.pdf, Apr. 24-28, 1994, pp. 452-458.*

Tollmar et al., "Gesture + Plav," http://www.ai.mit.edu/research/abstracts/abstracts2002/user-interfaces/29tolimar,pdf,downloaded 2009, oas. 419-420.*

Kanade et al., A Stereo Machine for Video-rate Dense Depth Mapping and Its New Applications'1, IEEE Computer Society Conference on Computer Vision and Pattern Recognition, 1996, pp. 196-202,The Robotics Institute, Carnegie Mellon University, Pittsburgh, PA.*

Miyagawa et al., "CCD-Based Range Finding Sensor", Oct. 1997, pp. 1648-1652, vol. 44 No. 10, IEEE Transactions on Electron Devices.*

Rosenhafin et al., "Automatic Human Model Generation", 2005, pp. 41-48, University of Auckland (CITR), New Zealand.*

Aggarwal et al., "Human Motion Analysis: A Review", IEEE Nonrigid and Articulated Motion Workshop, 1997, University of Texas at Austin, Austin, TX.*

Shao et al., "An Open System Architecture for a Multimedia and Multimodal User Interface", Aug. 24, 1998, Japanese Society for Rehabilitation of Persons with Disabilities (JSRPD), Japan.*

Kohler, "Special Topics of Gesture Recognition Applied in Intelligent Home Environments", In Proceedings of the Gesture Workshop, 1998, pp. 285-296, Germany.*

Kohler, "Vision Based Remote Control in Intelligent Home Environments", University of Erlangen-Nuremberg/ Germany, 1996, pp. 147-154, Germany.*

Kohler, "Technical Details and Ergonomical Aspects of Gesture Recognition applied in Intelligent Home Environments", 1997, Germany.*

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.*

Qian et al., "A Gesture-Driven Multimodal Interactive Dance System", Jun. 2004, pp. 1579-1582, IEEE International Conference on Multimedia and Expo (ICME), Taipei, Taiwan.*

Zhao, "Dressed Human Modeling, Detection, and Parts Localization", 2001, The Robotics Institute, Carnegie Mellon University, Pittsburgh, PA.*

He, "Generation of Human Body Models", Apr. 2005, University of Auckland, New Zealand.*

Isard et al., "Condensation—Conditional Density Propagation for Visual Tracking", 1998, pp. 5-28, International Journal of Computer Vision 29(1), Netherlands.*

Livingston, "Vision-based Tracking with Dynamic Structured Light for Video See-through Augmented Reality", 1998, University of North Carolina at Chapel Hill, North Carolina, USA.*

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.*

Breen et al., "Interactive Occlusion and Collusion of Real and Virtual Objects in Augmented Reality", Technical Report ECRC-95-02, 1995, European Computer-Industry Research Center GmbH, Munich, Germany.*

Freeman etal., "Television Control by Hand Gestures", Dec. 1994, Mitsubishi Electric Research Laboratories, TR94-24, Caimbridge, MA.*

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.*

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.*

Azarbayejani et al., "Visually Controlled Graphics", Jun. 1993, vol. 15, No. 6, IEEE Transactions on Pattern Analysis and Machine Intelligence.*

Granieri et al., "Simulating Humans in VR", The British Computer Society, Oct. 1994, Academic Press.*

Brogan et al., "Dynamically Simulated Characters in Virtual Environments", Sep./Oct. 1998, pp. 2-13, vol. 18, Issue 5, IEEE Computer Graphics and Applications.*

Fisher et al., "Virtual Environment Display System", ACM Workshop on Interactive 3D Graphics, Oct. 1986, Chapel Hill, NC.*

"Virtual High Anxiety", Tech Update, Aug. 1995, pp. 22.*

Sheridan et al., "Virtual Reality Check", Technology Review, Oct. 1993, pp. 22-28, vol. 96, No. 7.*

Stevens, "Flights into Virtual Reality Treating Real World Disorders", The Washington Post, Mar. 27, 1995, Science Psychology, 2 pages.*

"Simulation and Training", 1994, Division Incorporated.*

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.*

Qian et al., "A Gesture-Driven Multimodal Interactive Dance System", IEEE International Conference on Multimedia and Expo, Taipei, Jun. 2004, 3, 1579-1582.

Baudel, T. et al., "Charade: Remote Control of Objects using Free-Hand Gestures", http://citeseerx.ist.psu.edu/viewdoc/summary?doi=10.1.1.21.5996, Downloaded from Internet Dec. 9, 2008, 10 pages.

Jones, S. et al., "An Evaluation of Integrated Zooming and Scrolling on Small-Screens", http://people.cs.uct.ac.za, 26 pages, Downloaded from Internet Dec. 9, 2008.

(56) References Cited

OTHER PUBLICATIONS

Wilson, A.D., "PlayAnywhere : A Compact Interactive Tabletop Projection-Vision System", UIST, Oct. 23-27, 2005, 10 pages.
Wu, A. et al., "A Virtual 3D Blackboard: 3D Finger Tracking using a Single Cmaera", http://server.cs.ucf.edu, Downloaded from Internet Dec. 9, 2008, 8 pages.
B.C. Explorer Interactive 3D Display, Beijing Olympics, http://www/gesturetek.com, Oct. 3, 2008, 2 pages.
"Adding Virtual Objects with Hand Gestures in Real-Time", Mar. 22, 2007, http://video.google.com, 2 pages.
Shin, M.C. et al., "Towards Perceptual Interface for Visualization Navigation of Large Data Sets", Downloaded from Internet Dec. 9, 2008, http://citeseerx.ist.psu.edu.

\* cited by examiner

Hover and Highlight 720

NAVIGATION OF A VIRTUAL PLANE USING A ZONE OF RESTRICTION FOR CANCELING NOISE

BACKGROUND

Advances in the human computer interface ("HCI") represent a new frontier in human machine interaction. Typically people interact with computers using a mouse and keyboard. Video games generally use wired or wireless controllers with a series of buttons and/or joysticks.

It is desirable to provide new modes for HCI especially for interaction with entertainment or game titles. In particular, it is desirable to allow humans to interact with computers using natural gestures using wired or wireless controllers. However, it would be advantageous to eliminate the need for a physical controller and allow humans to utilize their own bodies and gestures for interaction.

Recently, new forms of HCI have emerged using touch. A user interacts with a computer and/or entertainment device by physically touching portions of a touch interface. Typically, the touch interface is the display device itself.

Although the use of gestures for HCI are known, controlling computers or specialized entertainment devices via interpretation of human gestures in a three-dimensional context is not well known. One significant problem with touchless interaction is that there is no notion of a physical plane. That is, with touch interaction there exists a physical interface such as the glass overlay on the display device that is nonexistent in the touchless paradigm. Thus, there is a need for new forms of HCI in a three-dimensional environment.

SUMMARY

A touchless HCI provides a virtual surface in three-dimensional space. The touchless HCI may receive input regarding a user movement, process the input to generate clean gesture data and analyze at least one dynamical variable to determine an interpreted action based upon a relationship of the clean gesture data with respect to the virtual surface. In addition to the virtual surface, a zone or restriction may be defined in order to eliminate noise due to wobble of the human arm as it extends along an axis in front of a user.

A Z-In and Z-Out state may be defined to indicate whether a user has currently extended the human appendage ("HA") within the virtual surface. Dynamical variables regarding the user's interaction within and without of the virtual surface may be interpreted to determine a select action, a hover and highlight action, a drag action and a swipe action.

A data plane and associated cursor may be dynamically modified to provide feedback based upon a user's touchless interaction. The cursor may become more focused as movement along the Z dimension in front of the user is performed. Other visual display attributes may be dynamically modified to show panning and scrolling of a data plane in response to touchless user interaction.

A system for analyzing HCI in a touchless environment may include a camera, a gesture engine, a physics engine, a virtual surface, a zone of restriction and an action interpretation engine. The camera may generate a signal as a function of a 3-D environment. The signal may be received by the gesture engine, which may process the camera signal to generate a clean gesture signal. The physics engine may receive the clean gesture signal and in turn update dynamical variables associated with a human appendage, the virtual surface and the zone of restriction. The action interpretation engine may interpret the clean gesture signal as a function of the virtual surface and virtual zone of restriction.

3DA-3DC represent an exemplary dynamical display behavior of data and a cursor within a data plane as a function of a touchless interaction according to one embodiment.

Figure 4A:
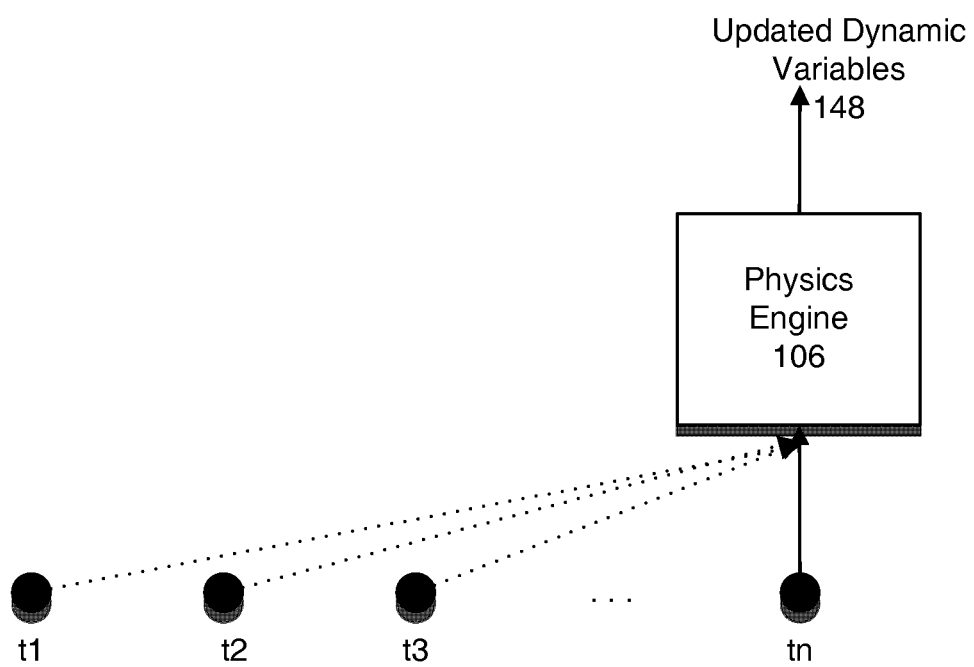

FIG. 4A illustrates an operation of a physics engine according to one embodiment.

Figure 4B:
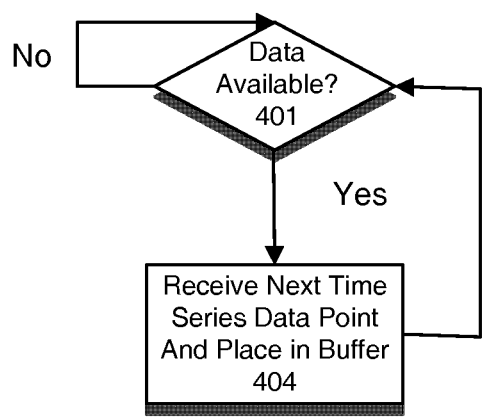

FIG. 4B is a flowchart illustrating an exemplary buffering of time series data.

Figure 4C:
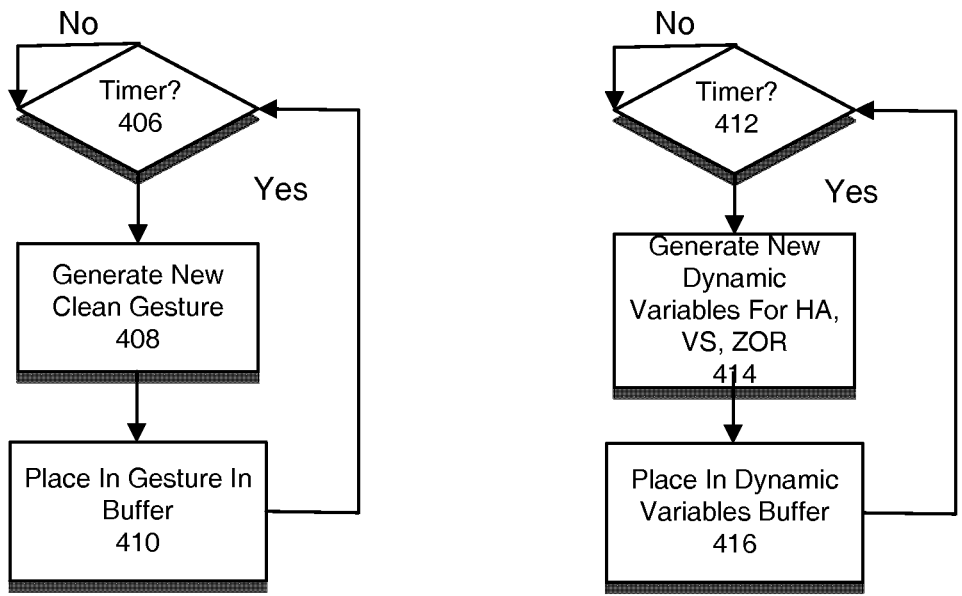

FIG. 4C shows a flowchart for exemplary operation of a gesture engine and exemplary operation of a physics engine.

Figure 4D:
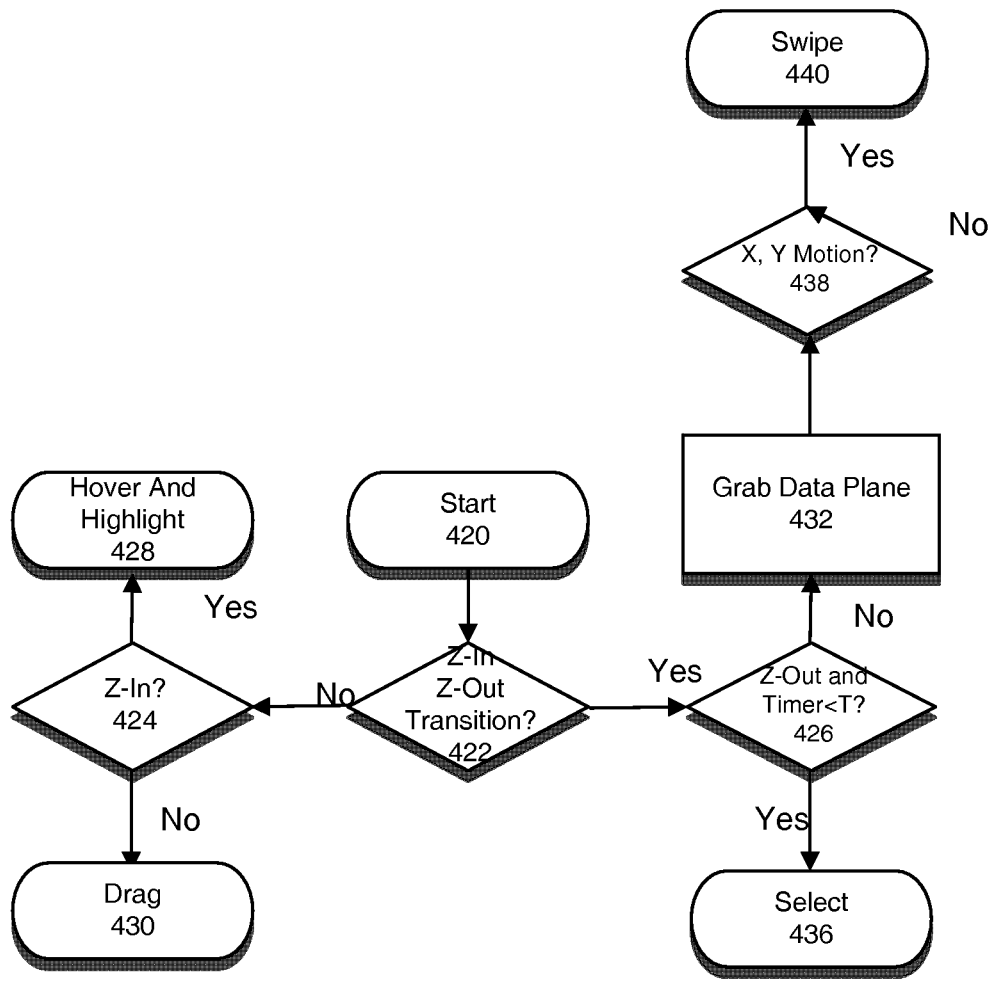

FIG. 4D is a flowchart depicting an exemplary operation of an action interpretation module.

Figure 5:
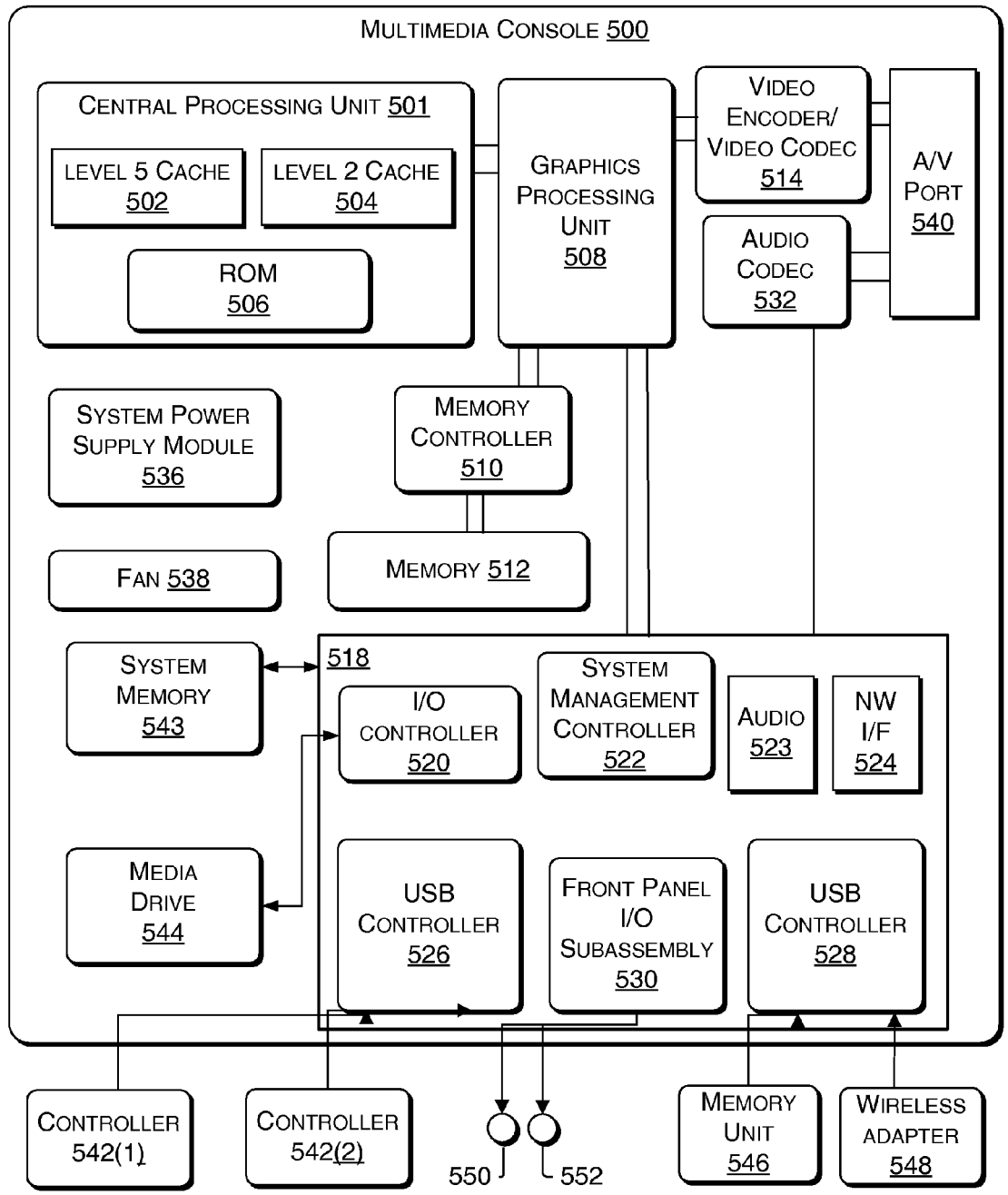

FIG. 5 illustrates an exemplary multi-media gaming computing environment in which in which the navigation techniques described herein may be embodied.

Figure 6:
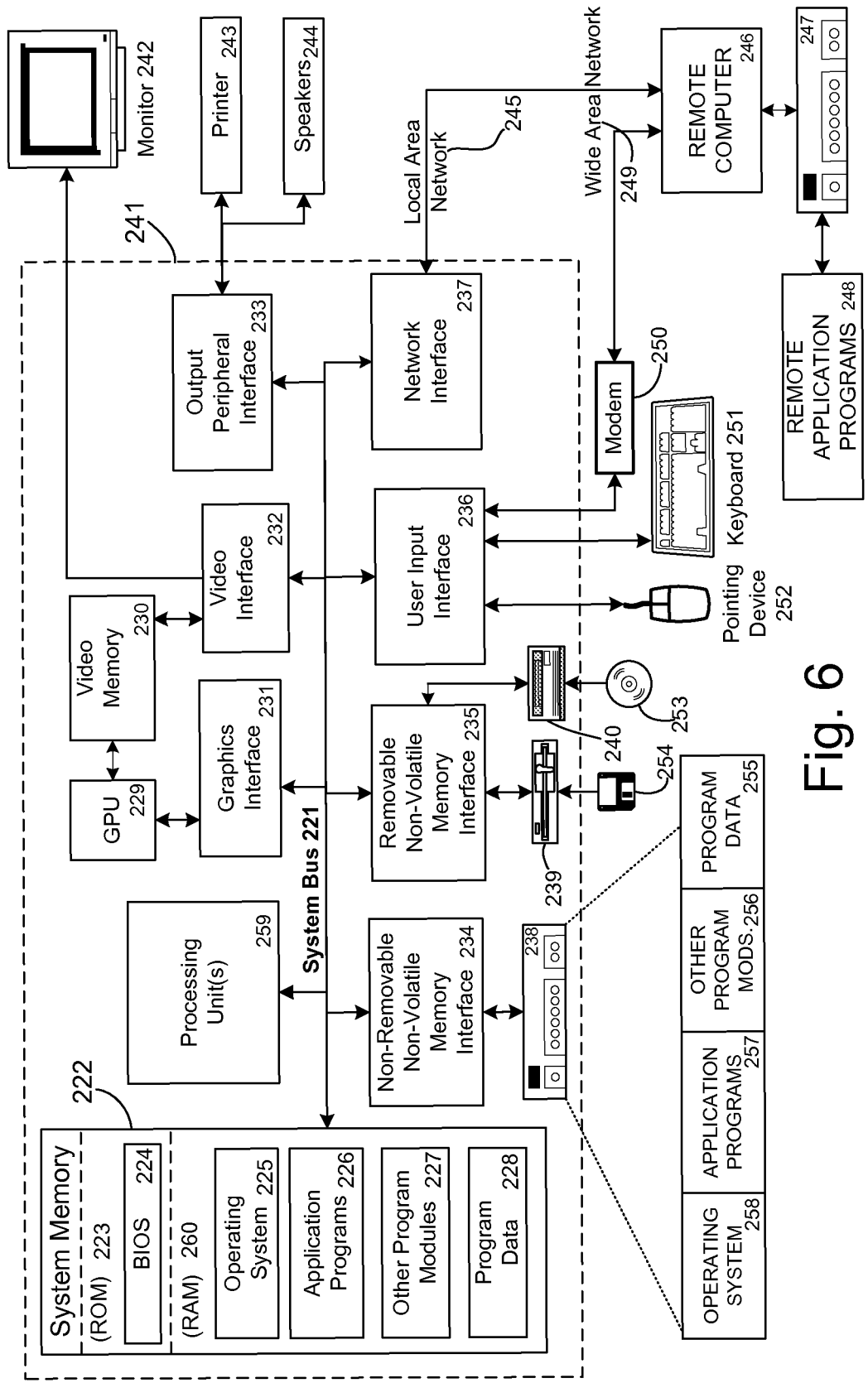

FIG. 6 illustrates an exemplary general purpose computing environment in which in which the navigation techniques described herein may be embodied.

DETAILED DESCRIPTION OF ILLUSTRATIVE EMBODIMENTS

Figure 1A:
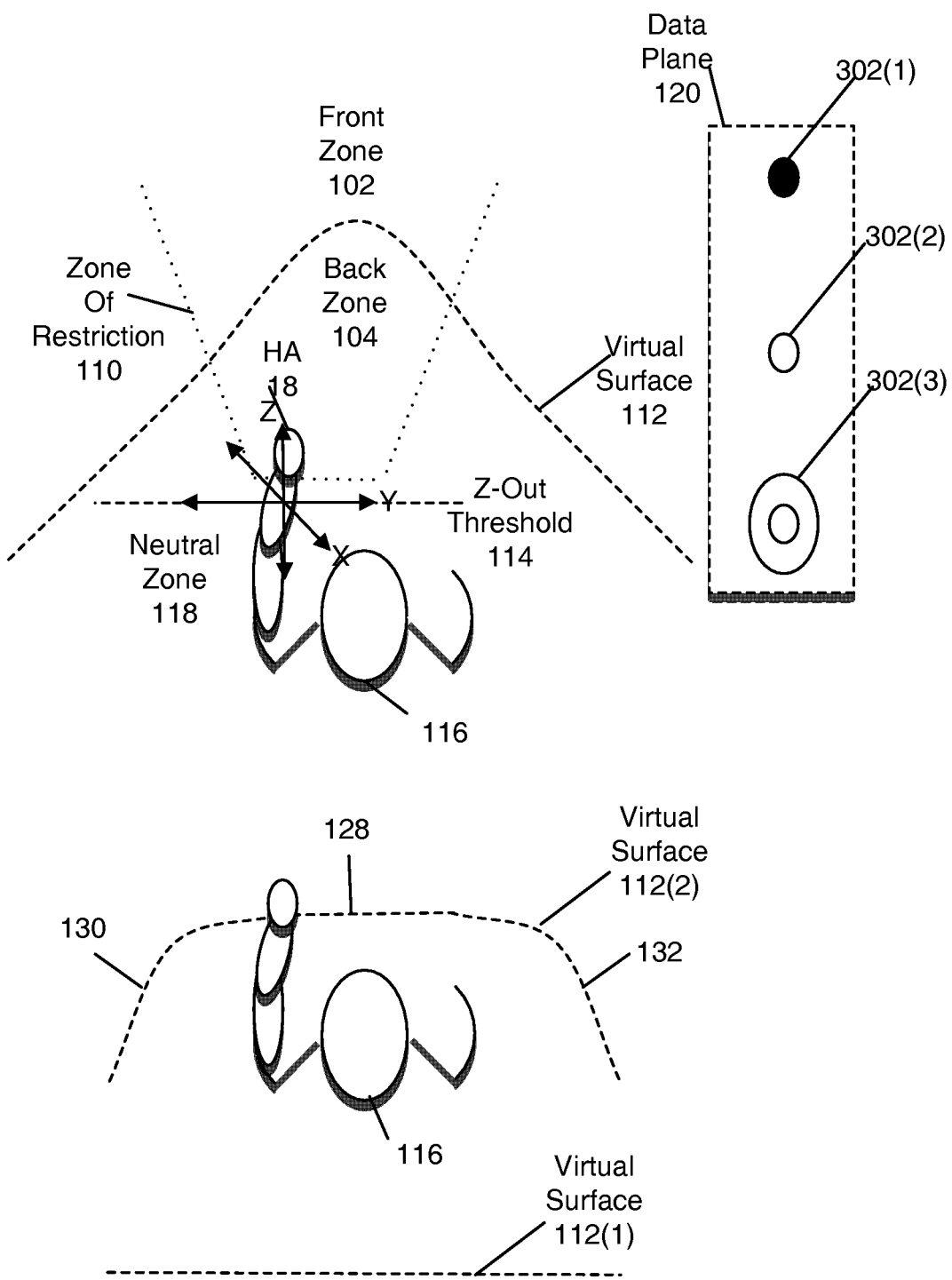
FIG. 1A depicts a virtual surface and zone of restriction in relation to a user.

FIG. 1A depicts a virtual surface and zone of restriction in relation to a user. User 116 may interact with a computer and/or entertainment device (not shown) in a touchless manner through movement and gesture in three dimensions. Any element or aspect of human movement may be used for interaction with the 3-D environment. In particular, as described in detail below, an orientation or a human appendage ("HA") 18 within the 3-D environment may be utilized for touchless interaction. According to one embodiment, HA 18 is a hand of user 116. As described in detail below, the orientation of HA 18 (e.g., hand) within 3-D space is analyzed to interpret gestures as specific actions.

Virtual surface 112 comprises an imaginary surface of arbitrary shape. The surface is "virtual" in the sense that its dimensions, extent and geometry are not physically manifested but are instead imaginary and represented in a computing device (not shown in FIG. 1A). User 116 may move within a 3-dimensional environment as represented by X, Y and Z axes. According to one embodiment, the geometry of virtual surface 112 is constant in the X dimension as shown in FIG. 1A but variable in the Y and Z dimensions as shown in FIG. 1A. However, according to alternative embodiments, virtual surface 112 may be variable in all dimensions.

Virtual surface may be planer in shape, e.g., 112(1). According to one embodiment, virtual surface extends around user 116 in a manner to suit the ergonomics of the human body. According to this embodiment, virtual surface 112 comprises flat portion 128 directly in front of user 116, first curved portion to the left 130 and second curved portion right 132 of user 116, e.g., 112(2). Virtual surface 112 may be fixed in space. However, instead virtual surface 112 may be variable in space, its origin moving as a function of a location of user 116. That is, according to one embodiment, an origin of virtual surface 112 is located at a point such as the center of mass ("COM") of user 116. Thus, for example, the origin of the virtual surface 112 may move in conjunction with the location of the solar plexus, for example relative to the chest of user 116. A method to accomplish this is described below. Furthermore, the geometry of virtual surface may be customized to individual users 116.

User interaction within the 3-D environment is interpreted with respect to an orientation of HA 18, for example an arm, in relation to virtual surface as will become evident as the method and system is further described. A front zone 102, back zone 102 and neutral zone 18 are respectively defined in front and in back of virtual surface 112, which may be used in specific contexts to interpret gestures as described in detail below.

Z-out threshold 114 may define a threshold or reference point along the Z-axis, which is used to interpret gestures as described in detail below. For example, movement of arm 18 may be determined within the Z dimension. Accordingly, Z-Out threshold 114 may be utilized to determine whether HA 18 should be considered in back of virtual surface 112. According to one embodiment, it is desirable to define a "neutral" 18 or "no action" zone close to the user's chest out to Z-out threshold 114. Until HA 18 extends forward beyond neutral zone no gestures are interpreted.

Due to the geometry of the human body, as user 116 zooms in and out along the Z-axis the human hand tends to diverge from movement along a straight line. According to empirical measurements, the wobble tends to become move pronounced in the X and Y dimensions as the z coordinated increases (in the forward direction). In other words, there exists a natural wobble due to the geometry of the human arm and hand and the bone configuration. According to one embodiment, this wobble, which may be viewed as noise, must be canceled in order to achieve accurate interpretation of human gestures.

FIG. 1A shows zone of restriction 110, which is a mathematical construct devised to compensate for this natural wobble. Similar to virtual surface 112, zone of restriction 110 is virtual and thereby represented purely inside a computational device. Zone of restriction 110, similar to virtual surface 112, may also have a variable origin as a function of a point on the human such as COM. According to one embodiment, zone of restriction 110 is an area or perimeter in the X and Y dimensions and is a function of the z coordinate alone.

$$Zone\_Restriction(z)=f(X(z),Y(z))$$

Zone of restriction 110 defines a level of sensitivity to movement of HA 18 within the X and Y dimensions. The larger the area of the zone as a function of the z coordinate, the less sensitive the system is to wobble. In order to compensate for the natural wobble of the human arm movement, zone of restriction 110 may be a conical shape. That is, at the beginning of the cone, the system is more sensitive to movement in the X and Y dimensions while as HA 18 moves forward, the system becomes less sensitive to variations in X and Y dimensions. This results in cancellation of X and Y wobble or noise. Zone of restriction 110 may be a linear or nonlinear function of z.

In other words, zone of restriction 110 provides a mathematical definition for noise cancellation due to natural wobble due to the geometry of the human arm. Viewed from another perspective, zone of restriction 110 represents the certainty of a selection event occurring. The more certain that a select event will occur (the closer HA 18 is in front of virtual surface 112), the more noise is eliminated.

FIG. 1A also shows data plane 120, which is used to display data in a display configuration as controlled by actions as interpreted human gestures. For example, data plane may display text or graphics information that user 116 is viewing. As user 116 may perform gestures in three dimensions and thus the distance from virtual surface 112 to HA 18 may be essential feedback to user 116. FIG. 1A also shows exemplary dynamics of a cursor displayed in data plane 120 in relation to the location of HA 18 in the Z dimension.

Thus, as shown in FIG. 1A, cursor 302(1), 302(2) and 302(3) may be dynamically modified as a function of a Z dimension distance of HA 18 from virtual surface 112. Thus, for example cursor 302(1) may be displayed when HA is in front zone 102, cursor 302(2) is displayed when HA is in a middle position and cursor 302(3) is display when HA 11 is in back zone 104. The cursor variations shown in FIG. 1A are merely exemplary, and any display pattern and dynamics for cursor 302 may be defined. In general, according to one embodiment, when HA is close to the human body, cursor 302 is displayed as several concentric rings. As HA 18 moves closer to virtual surface 112, cursor 302 may become more focused such as a bull's-eye pattern.

Display of cursor 302 may also be dynamically modified depending upon a mode as determined by an action interpreted based upon a human gesture. For example, if an item on data plane 120 is selected cursor 302 may be displayed in a manner to signal that a selection has occurred.

According to an alternative embodiment, a user may hold a simple device such as a small ball rather than use the HA alone for touchless interaction. The object such as a ball might provide feedback to the system to indicate that touchless interaction is now engaged. Further, the object might have a button that is used to signal select actions (described below). The object might also provide haptic feedback such as, for example, a rumble. The object might also employ a reflective surface that is highly visible to camera 140.

Figure 1B:
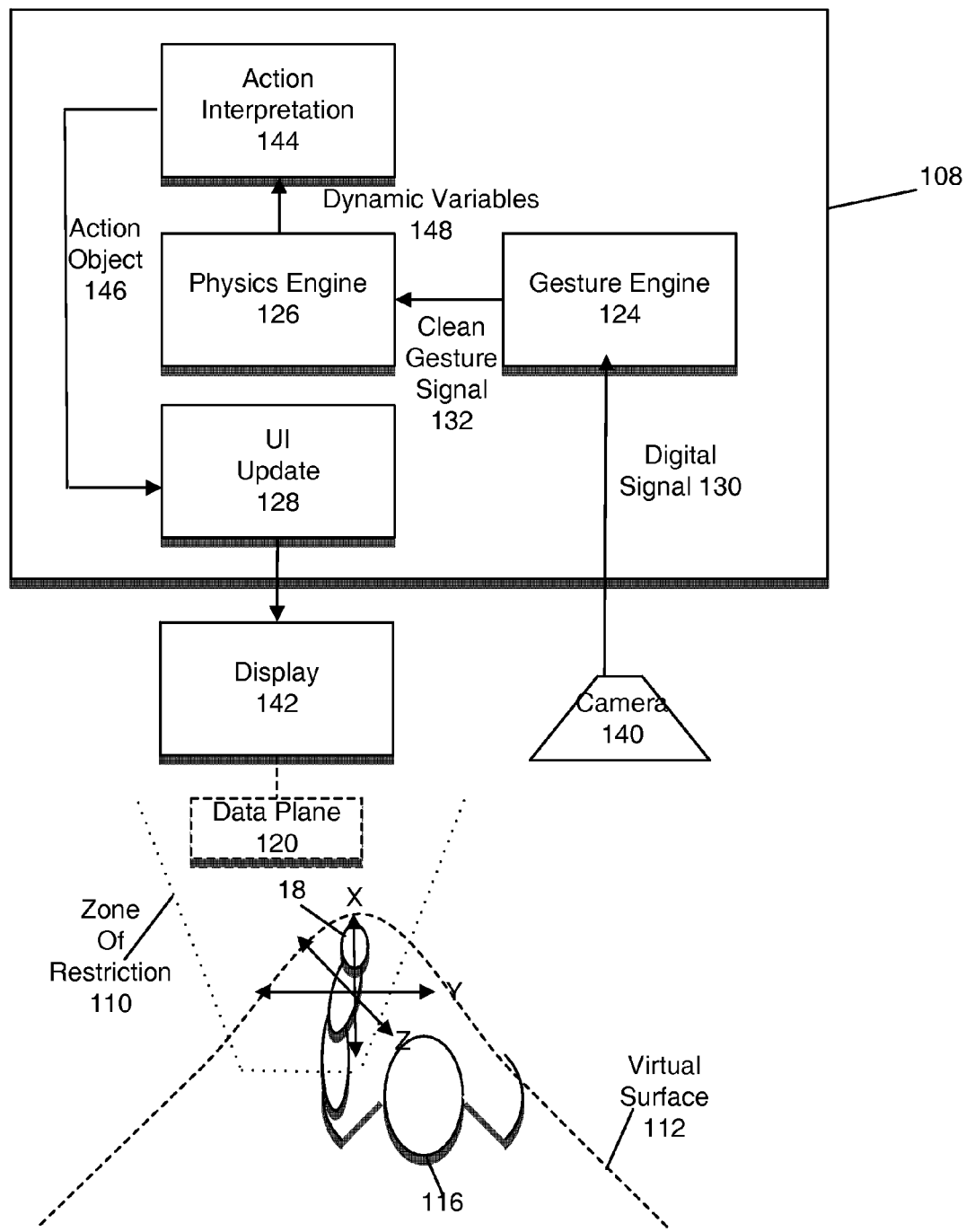
FIG. 1B shows an exemplary architecture of a system for interpreting human interaction in a touchless environment according to one embodiment.

FIG. 1B shows an exemplary architecture of a system for interpreting human interaction in a touchless according to one embodiment. User 116 may move or perform gestures in a 3-D environment. The spatial configuration of user 116 and any associated HAs 18 is received by camera 140. Camera 140 may be any type of device receiving an electromagnetic signal in the visual spectrum (light) and generating some type of output, which may be analog or digital. FIG. 1B shows specifically the output of camera 140 as digital signal 130. In the case where camera 140 generates an analog signal, it is understood that the signal is first filtered by an anti-aliasing filter and then digitized before transmission to computing device 108.

Digital signal 130 may be a sampled time series of pixel values in a three-dimensional lattice representing the time evolution of user 116 in space and time. The pixel values may be of any bit resolution and depth representing either color or grey scale data and the sampling rate may be arbitrarily adjusted based upon the a characteristic time scale of user 116 interaction.

Computing device 108 comprises gesture engine 124, physics engine 126, action interpretation module 144 and UI update module 128. Gesture engine 124 receives a digital signal 130 from camera 140 representing the spatial orientation of user 116 in a 3-D environment. Upon receiving digital signal 130 from camera 140, gesture engine 124 filters digital signal to generate clean gesture signal 132. Clean gesture signal 132 may be a time series representation of the dynamical behavior of a particular point of user 116 such as the COM of user 116. Thus, gesture engine 124 may utilize compute vision techniques such as optical flow or other techniques to isolate the dynamical behavior of a particular point of user 116 such as COM. In addition, as noted, gesture engine 124 may remove noise and/or perform other filtering of received digital signal 130.

Gesture engine 124 provides clean gesture signal 132 to physics engine 126. Physics engine 126 may generate a mathematical representation of dynamical behavior of desired point(s) such as COM on user 116 by analyzing clean gesture signal in the form of dynamic variables 148 such as spatial position. Thus, for example, physics engine 126 may generate a time series representation of the spatial location of COM of user 116. Physics engine 126 may also generate other dynamical variables such as velocity, acceleration and any other information of interest based upon clean gesture signal 132. Furthermore, physics engine 126 may provide an update of the origin location of both virtual surface 112 and zone of restriction 110 as a function of the determined current location of user 116.

Physics engine 126 provides a time series of dynamical variables representing one or more points on user 116 to action interpretation module 144. Action interpretation module converts dynamical variables representing point(s) on user 116 such as COM into an interpreted action such as a select, hover and highlight, drag, swipe, etc. as described below. In particular, action interpretation module may generate action object 146, which is a data structure representing the type of action (e.g., select, swipe, highlight and hover, drag, etc.) and other parameters describing that action and provide action object 146 to UI update module 128. Action interpretation module 144 may interpret actions based upon the orientation of HA 18 with respect to virtual surface 112 and zone of restriction 110.

UI update module receives action object 146 and uses this information to update a user interface for controlling the display data in data plane 120. UI update module 128 may also control the dynamics and visual representation of cursor 302 as a function of a current action and associated spatial orientation of user 116 and in particular HA 18.

The output of UI update 128 is provided to display 142 in order to display data plane 120, which includes a perspective view of currently viewed data and cursor 302 as a function of a current state of user 116 dynamics and spatial orientation.

Figure 2A:
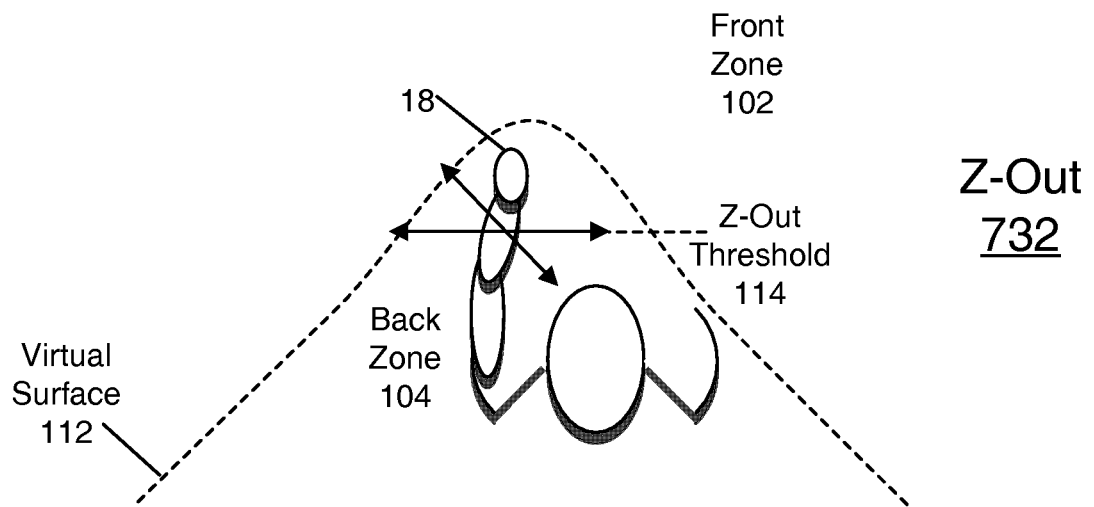
FIG. 2AA-2AAB respectively illustrate a Z-Out and Z-In state.
Figure 2A:
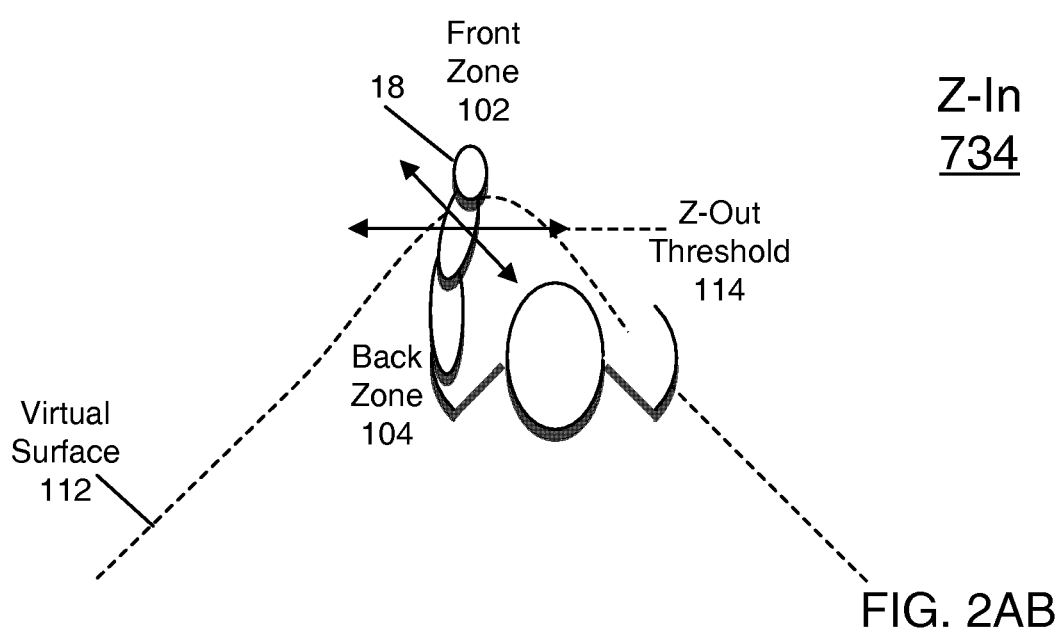

FIGS. 2AA and 2AB respectively illustrate a Z-Out and Z-In state. FIG. 2AA illustrates Z-Out state 732. Z-Out state 732 may be interpreted by action interpretation module 144 based upon dynamics information provided by physics engine 126. Z-Out state 732 is characterized by HA 18 located in back zone 104 with respect to virtual surface 112.

Conversely, as shown in FIG. 2AB, Z-In state 734 is characterized by HA 18 located in front zone 104 with respect to virtual surface 112. Z-In state 734 may be interpreted by action interpretation module 144 based upon dynamics information provided by physics engine 126.

Figure 2B:
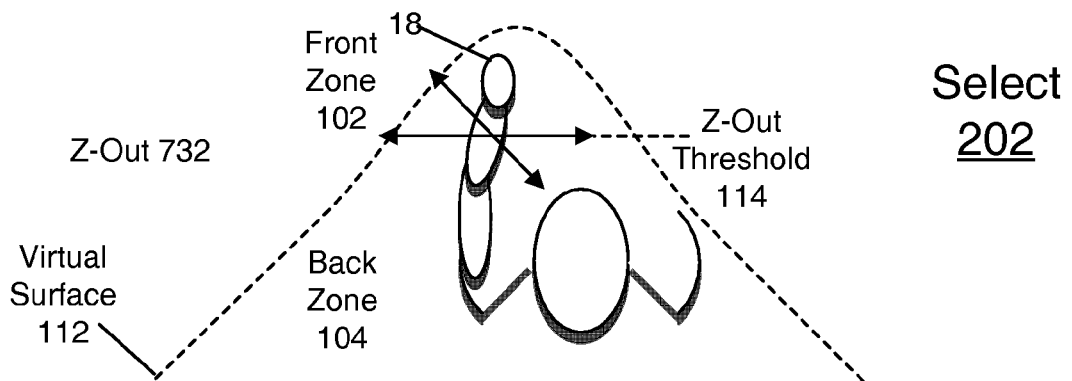
FIGS. 2BA-2BC illustrate a select action according to one embodiment.
Figure 2B:
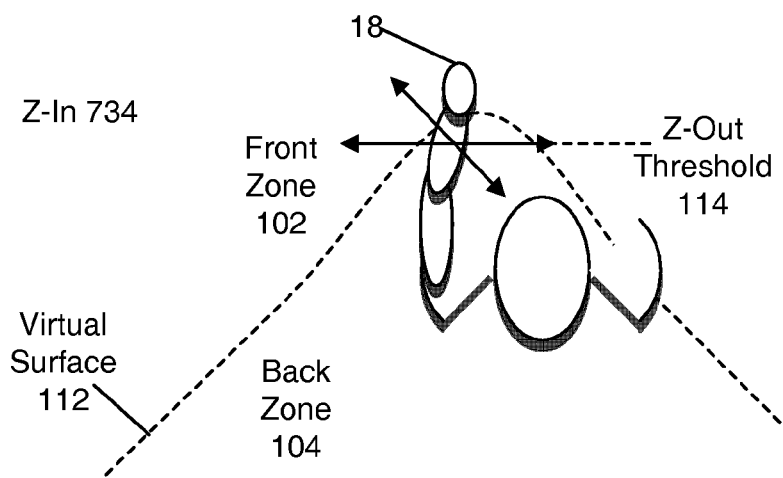
Figure 2B:
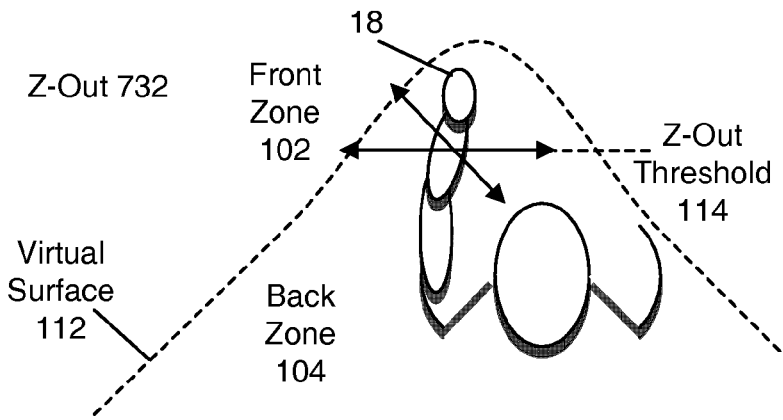

FIGS. 2BA-2BC illustrate a select action according to one embodiment. Select action 202 refers to selecting an object or item in data plane 120 (not shown in FIGS. 2BA-2BC). Select action 202 may be interpreted by action interpretation module 144 based upon dynamics information provided by physics engine 126. Select action 202 may be interpreted as the transition of HA 18 from a Z-Out 732 state (FIG. 2BA) to a Z-In state 734 (FIG. 2BB) and finally to a Z-Out state 732 (FIG. 2BC) within a predetermined time period.

Figure 2C:
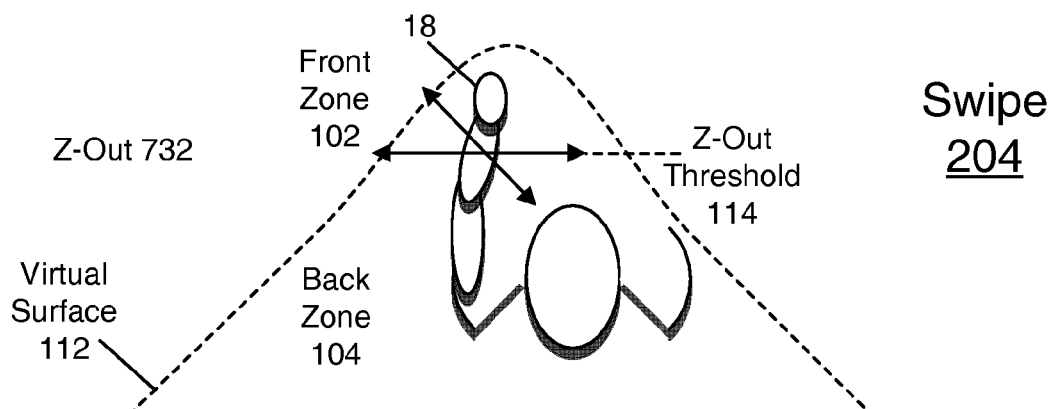
FIGS. 2CA-2CC illustrate a swipe action according to one embodiment.
Figure 2C:
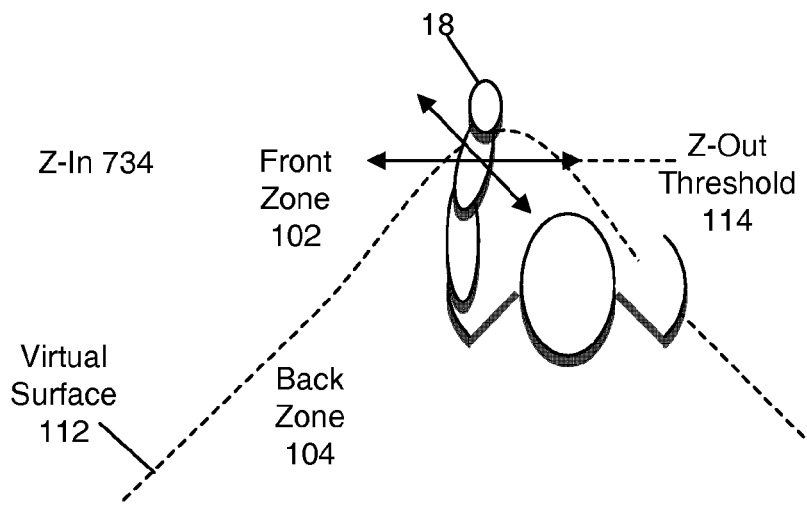
Figure 2C:
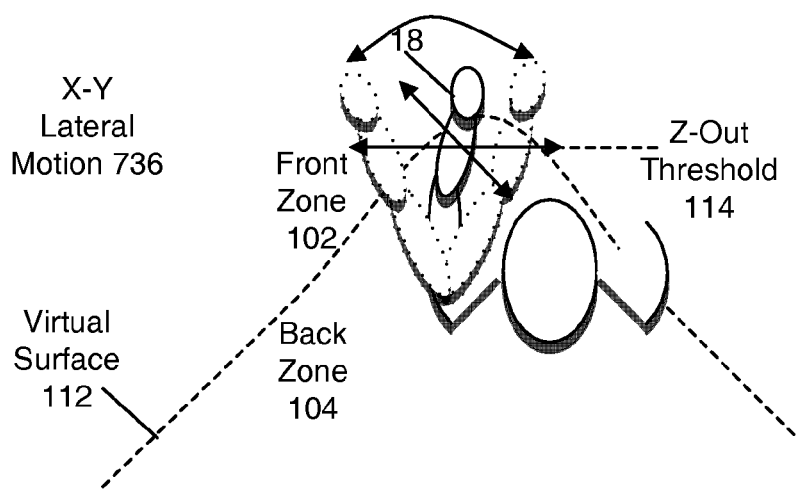

FIGS. 2CA-2CC illustrate a swipe action according to one embodiment. Swipe action 204 refers to selecting data plane 120 itself (not shown in FIGS. 2CA-2CC) and scrolling in the X and or Y dimensions (not shown in FIG. 2B). Swipe action 204 may be interpreted by action interpretation module 144 based upon dynamics information provided by physics engine 126. Swipe action 204 may be interpreted as the transition of HA 18 from a Z-Out 732 state (FIG. 2CA) to a Z-In state 734 (FIG. 2CB) and finally to X-Y lateral motion 736 (FIG. 2CC).

Figure 2D:
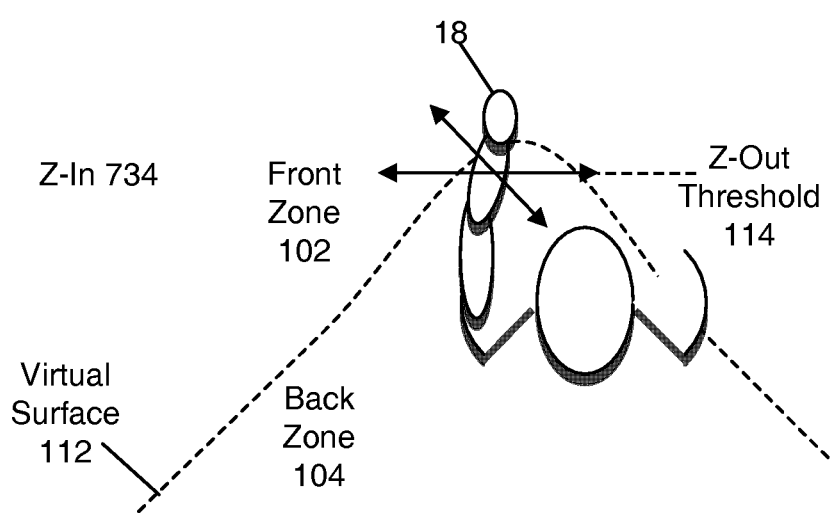
FIGS. 2DA-DB illustrate a hover and highlight action according to one embodiment.
Figure 2D:
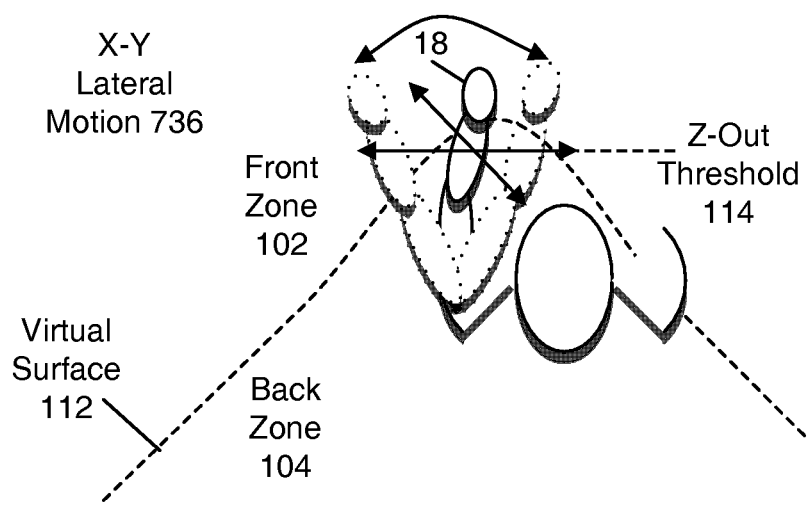

FIGS. 2DA-DB illustrate a hover and highlight action according to one embodiment. Hover and highlight action 720 refers to hovering a cursor and/or highlighting items, objects and/or data within data plane 120 itself (not shown in FIGS. 2DA-2DB). Hover and highlight action 720 may be interpreted by action interpretation module 144 based upon dynamics information provided by physics engine 126. Hover and highlight action 204 may be interpreted as commencing from Z-In state 734 (FIG. 2DA) to X-Y lateral motion 736 (FIG. 2DB).

Figure 2E:
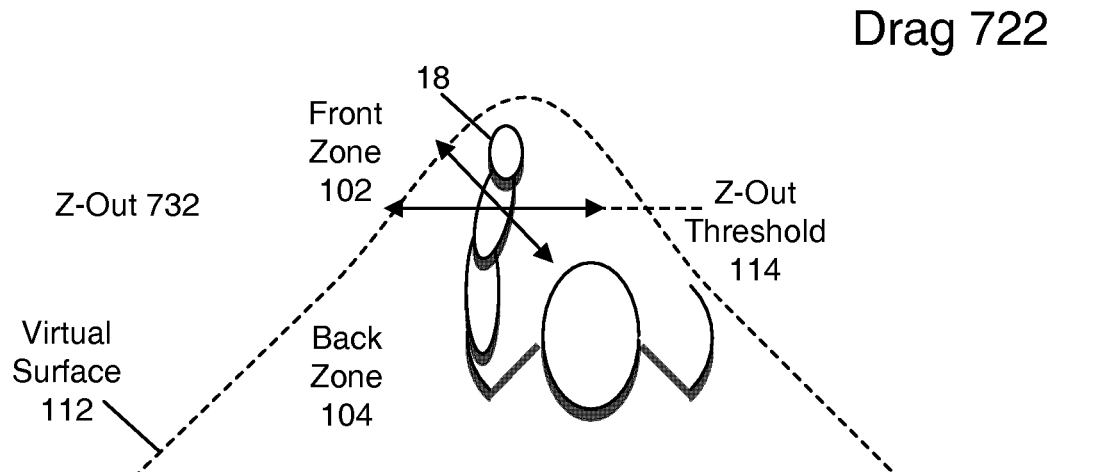
FIGS. 2EA-EB illustrate a drag action according to one embodiment.
Figure 2E:
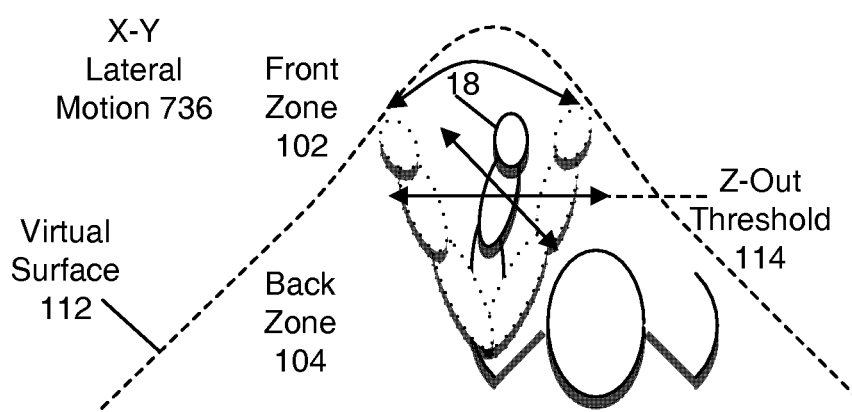

FIGS. 2EA-EB illustrate a drag action according to one embodiment. Drag action 722 refers to dragging objects and/or data within data plane 120 itself (not shown in FIGS. 2EA-2EB). Drag action 722 may be interpreted by action interpretation module 144 based upon dynamics information provided by physics engine 126. Drag action 722 may be interpreted as commencing from Z-Out state 732 (FIG. 2EA) to X-Y lateral motion 736 (FIG. 2DB).

Figure 3A:
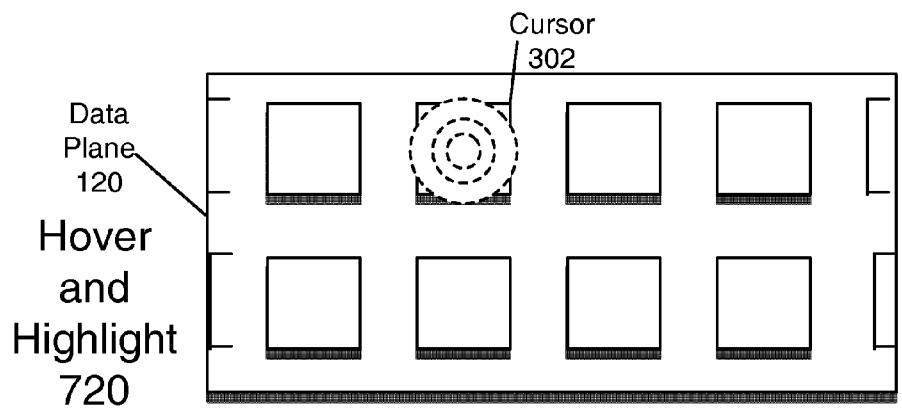
FIGS. 3AA-3AC represent an exemplary dynamical display behavior of data and a cursor within a data plane as a function of a touchless interaction according to one embodiment.
Figure 3A:
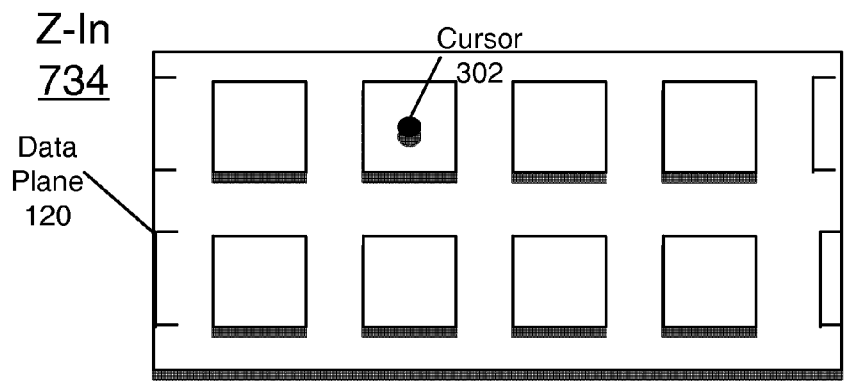
Figure 3A:
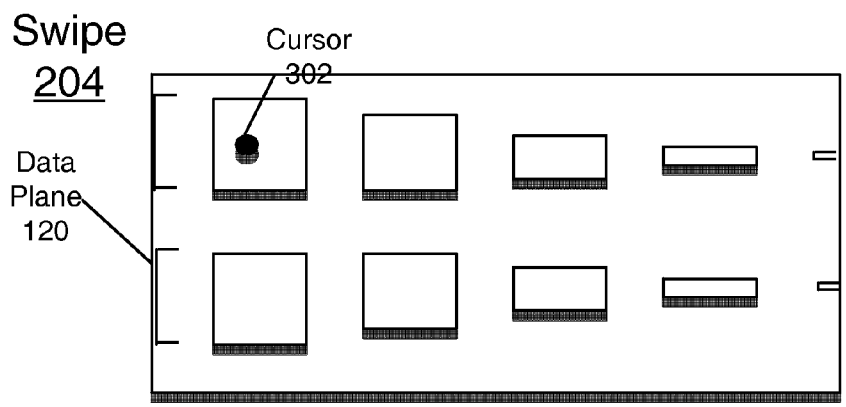

FIGS. 3AA-3AC represent an exemplary dynamical display behavior of data and a cursor within a data plane as a function of a touchless interaction according to one embodiment. FIG. 3AA shows the state of cursor 302 in highlight and hover state 720, wherein the current state is Z-Out (i.e., HA 18 in back zone 104) 114. Cursor 302 may be displayed using a ripple animation pattern to indicate to user 116 how close they are to virtual surface 112. FIG. 3AB shows the dynamics of cursor 302 as HA 18 moves forward through virtual surface 112. In particular, as shown in FIG. 3AB, cursor 302 may become focused to a small solid dot. FIG. 3AC shows an exemplary graphical display of data plane 120 after a swipe action 204 is performed. As HA 18 swipes sideways, data plane 120 slides in a lateral direction and provides a perspective display of the movement (indicated by transition from parallel to convergent lines). Cursor 302 in FIG. 3CC indicates a location of HA 18.

Figure 3B:
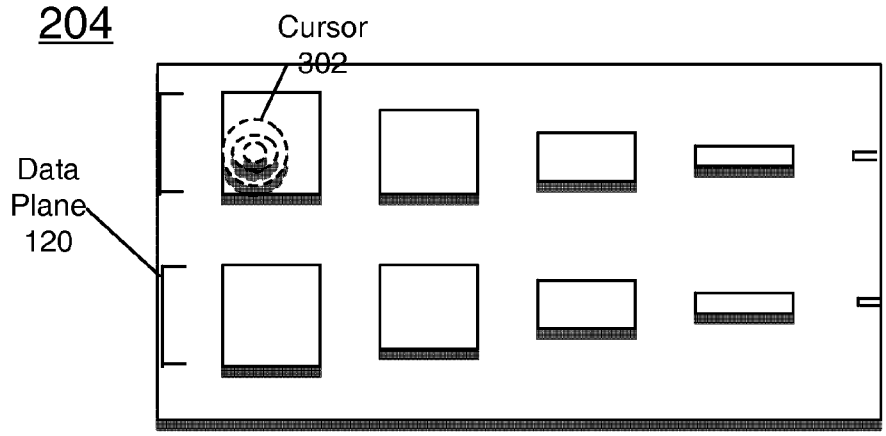
FIGS. 3BA-3BB further represent an exemplary dynamical display behavior of data and a cursor within a data plane as a function of a touchless interaction according to one embodiment.
Figure 3B:
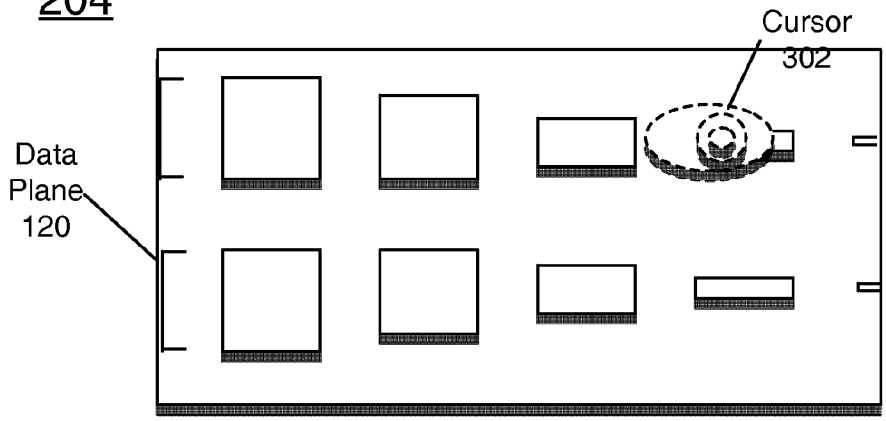

FIGS. 3BA-3BB further represent an exemplary dynamical display behavior of data and a cursor within a data plane as a function of a touchless interaction according to one embodiment. In particular, FIG. 3B illustrates an exemplary graphical display in data plane 120 as HA 18 comes out of virtual surface 112. Cursor 302 transitions from a dot back into a ripple pattern and data plane displays objects, items and data with perspective. FIG. 3BB graphically illustrates data plane 120 as HA 18 moves to the right. Cursor 302 remains in a ripple pattern but moves to the right. Data plane 120 continues to display objects, items and data with perspective.

Figure 3C:
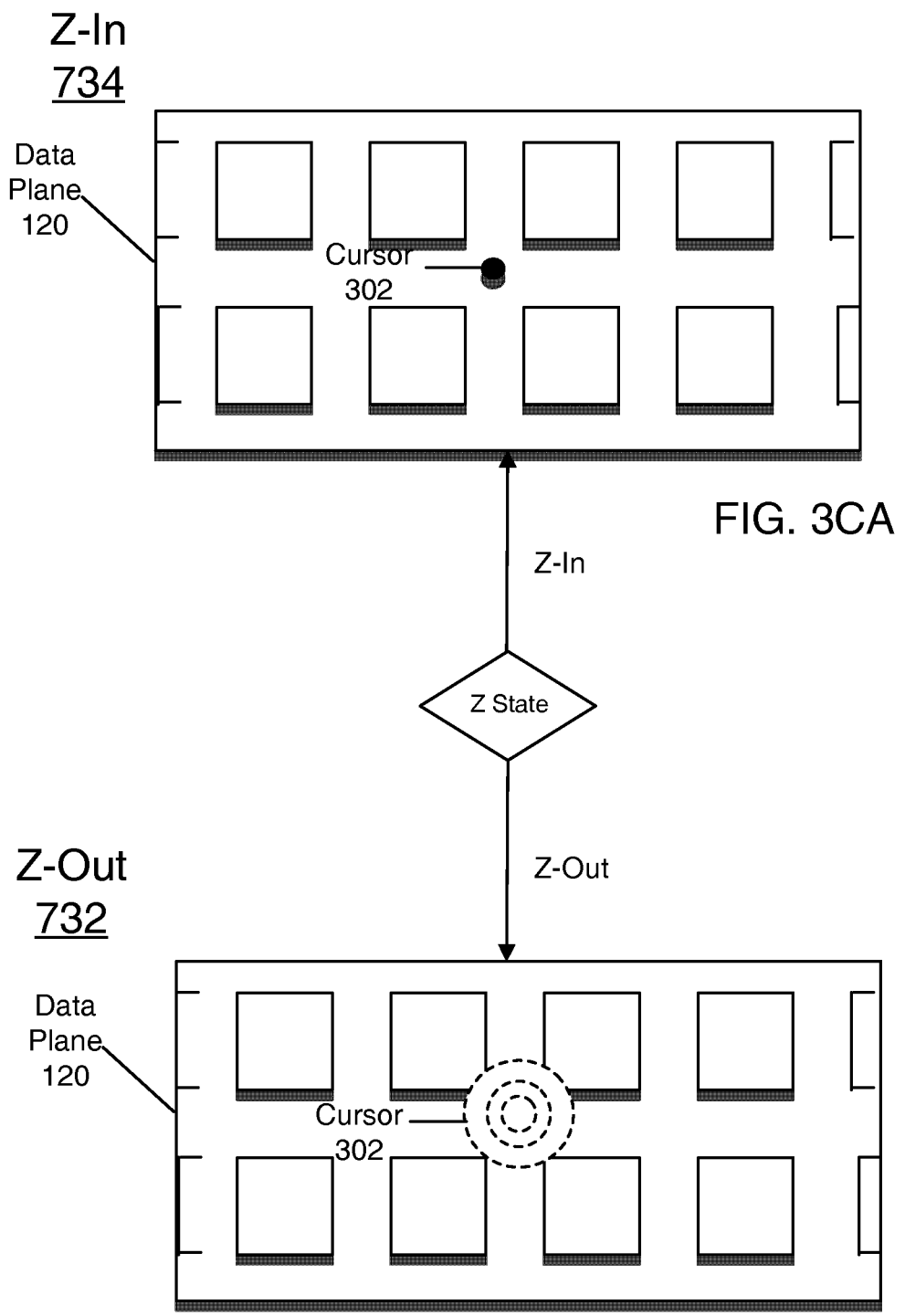
FIGS. 3CA-3CB further represent an exemplary dynamical display behavior of data and a cursor within a data plane as a function of a touchless interaction according to one embodiment.

FIGS. 3CA-3CB further represent an exemplary dynamical display behavior of data and a cursor within a data plane as a function of a touchless interaction according to one embodiment. In particular, FIGS. 3CA-3CB illustrate a particular embodiment in which if a HA 18 does not signal an action to move data plane 120 in a lateral direction (right or left), after a pre-determined time period, data plane 120 shifts back to a straight-on view. According to one embodiment, this transition to a straight-on view will depend upon whether preceding the expiration of the predetermined time period the current state was Z-In 734 or Z-Out 732. In particular, if the preceding state was Z-Out 732 in FIG. 3CB, in addition to transition to a straight on display of data plane 120 cursor transitions to a ripple display. On the other hand, if the preceding state was Z-In 734, in addition to transition to a straight-on display of data plane 120, cursor 320 transition to a dot pattern and subsequent transition to a Z-Out state 732 will cause selection of an object on which cursor 302 is positioned.

Figure 3D:
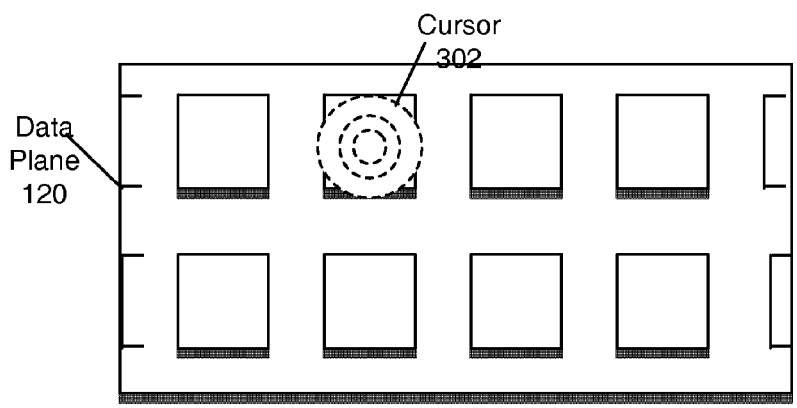
Figure 3D:
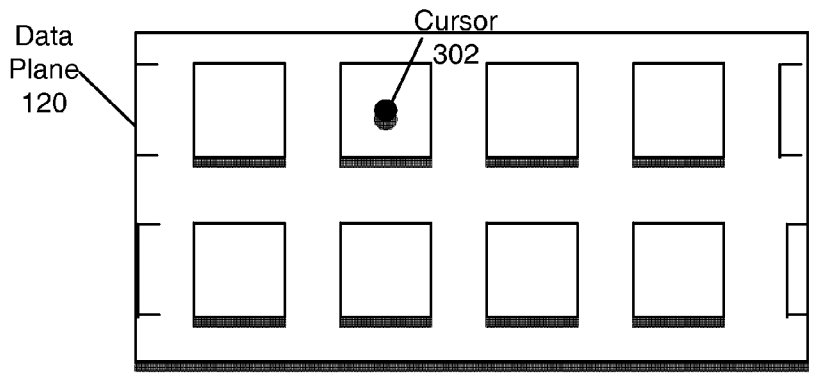
Figure 3D:
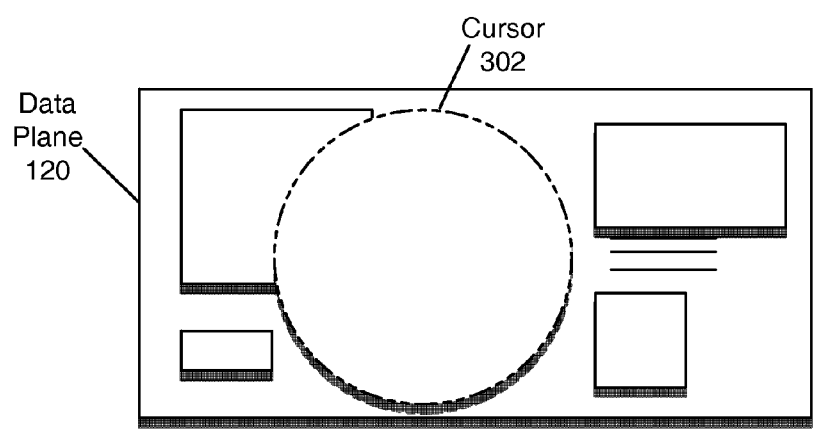

3DA-3DC represent an exemplary dynamical display behavior of data and a cursor within a data plane as a function of a touchless interaction according to one embodiment. FIGS. 3DA-3DC graphically illustrate the behavior of data plane 120 and cursor 302 in response to select action 202. FIG. 3DA shows the state of cursor 302 in Z-Out state 732, which may be displayed using a ripple animation pattern to indicate to user 116 how close he is to virtual surface 112. FIG. 3DB-3DC shows the dynamics of cursor 302 as HA 18 moves forward through virtual surface 112 and back out again as the select action is performed. In particular, as shown in FIG. 3DB, cursor 302 may become focused to a small solid dot as Z-In state 734 is entered. FIG. 3DC shows an exemplary graphical display of data plane 120 after a select action 202 is completed. As HA 18 comes out of virtual surface 112 and Z-Out state 732 is entered again, cursor 302 displayed as a dot is shown in a blinking pattern to show that an object was selected. After a predetermined time period, data plane 120 zooms to display details of the selected object, item, data value or page.

According to an alternative embodiment, instead of changing the shape of cursor 302, upon user 116 selecting an item, or data object shown in data plane 120, the selected item in data plane 120 may be displayed to move forward and back along the Z dimension indicating that user 116 has activated that UI layer or item. Conceptually this may be analogized to reaching below a water surface to grab the UI FIG. 4A illustrates an operation of a physics engine according to one embodiment. Physics engine 106 receives a time series of data values from gesture engine 104 representing clean gesture signal 132. Physics engine outputs updated dynamic variables 148 based upon the received time series data. Dynamic variables 148 may represent time dependent spatial information for HA 18 COM of user 116 or some other point as well as other dynamic variables such as velocity and/or acceleration. In addition dynamic variables output by physics engine may further comprise current spatial location of virtual surface 112 and zone of restriction 110.

FIG. 4B is a flowchart illustrating an exemplary buffering of time series data. Time series data from camera 140 may be buffered before supplying the data to gesture engine 124. In 401, it is determined whether new data is available from camera 140. If not ('No' branch of 401) flow continues with 401. If so ('Yes' branch of 401), flow continues with 404 and a next time series data point is received and placed in a buffer. Flow then continues with 401.

FIG. 4C shows a flowchart for exemplary operation of a gesture engine and exemplary operation of a physics engine. In particular 406-410 relate to gesture engine 104 and 412-416 relate to physics engine 106. With respect to gesture engine 104, in 406, it is determined whether a time has expired. If not ('No' branch of 406), flow continue with 406. If so ('Yes' branch of 406), flow continues with 408 and new clean gesture data 132 is generated. In 410, clean gesture data 132 is placed in a buffer and flow continues with 406.

With respect to physics engine 106, in 412, it is determined whether a time has expired. If not ('No' branch of 412), flow continue with 414. If so ('Yes' branch of 412), flow continues with 414 and new dynamic variables 148 is generated, which may include dynamic variables for HA 18, virtual surface 112 and zone of restriction 110. In 416, dynamic variables are placed in a buffer where they are made available for action interpretation module 144.

FIG. 4D is a flowchart depicting an exemplary operation of an action interpretation module. Action interpretation module 144 may receive dynamic variables 148 from physics engine 106 in order to generate an action object 146. The process is initiated in 420. In 422 it is determined whether a transition between Z-In 734 and Z-Out states has occurred. If no transition is detected, in 424 it is determined whether the current state is Z-In 434. If not ('No' branch of 424) in 430 the interpreted action is a drag action 722. Otherwise ('Yes' branch of 424) in 428 the interpreted action is a hover and highlight action 720.

If a Z-In/Z-Out transition is detected in 422 ('Yes' branch of 422), flow continues with 426. In 426 it is determined whether a timer has run before a Z-Out transition (i.e., is less than a threshold T). If so ('No branch of 426), flow continues with 432 and it is understood that user 116 has grabbed data plane 120. In 438 it is determined whether user 116 has provide X/Y motion in the lateral plane. If not ('No' branch of 438), flow continues with 438. If so ('Yes' branch of 438), flow continues with 440 and the interpreted action is swipe 204 in 440.

If, on the other hand, the timer is less than the threshold T and a Z-Out transition has occurred in 426, flow continues with 436 and select action 202 is interpreted as occurring.

The system, methods and components of the navigation techniques described herein may be embodied in a multimedia console, such as a gaming console, or in any other computing device in which it is desired to recognize gestures of a user for purposes of user input, including, by way of example and without any intended limitation, satellite receivers, set top boxes, arcade games, personal computers (PCs), portable telephones, personal digital assistants (PDAs), and other hand-held devices.

FIG. 5 is a block diagram of one example of a multimedia console 500, such as a gaming console, in which the navigation techniques described herein may be embodied. The multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. The CPU 501 may be provided having more than one core, and thus, additional level 1 and level 2 caches 502 and 504. The flash ROM 506 may store executable code that is loaded during an initial phase of a boot process when the multimedia console 500 is powered ON.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface controller 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 148, and an external memory device 546 (e.g., flash memory, external CD/DVD ROM drive, removable media, etc.). The network interface 124 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, hard drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio player or device having audio capabilities.

The front panel I/O subassembly 530 supports the functionality of the power button 550 and the eject button 552, as well as any LEDs (light emitting diodes) or other indicators exposed on the outer surface of the multimedia console 500. A system power supply module 536 provides power to the components of the multimedia console 500. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered ON, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community.

When the multimedia console 500 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

As another example, FIG. 6 is a block diagram of a general purpose computing device in which the navigation techniques described herein may be employed. Numerous embodiments of the present disclosure may execute on a computer. For example, the computer executable instructions that carry out the processes and methods for providing PC experiences on gaming consoles may reside and/or be executed in such a computing environment as shown in FIG. 5. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 241 typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 6 illustrates operating system 225, application programs 226, other program modules 227, and program data 228.

The computer 241 may also include other removable/non-removable, volatile/nonvolatile computer storage media. By way of example only, FIG. 6 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 6, provide storage of computer readable instructions, data structures, program modules and other data for the computer 241. In FIG. 6, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 6. The logical connections depicted in FIG. 6 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 6 illustrates remote application programs 248 as residing on memory device 247. It will be appreciated that the network connections shown are exemplary and other means of establishing a communications link between the computers may be used.

What is claimed:

1. A method for human computer interaction comprising:
defining a virtual surface in three-dimensional space;
defining a zone of restriction as an area or perimeter in X and Y dimensions that is a function of a Z coordinate in a Z dimension that extends in a forward direction from the human, the zone of restriction defining a sensitivity to movements of a human appendage, wherein the sensitivity to movements is reduced as the human appendage is moved forward relative to an origin that is a function of the location of the human;
receiving input generated from a camera regarding the human appendage movement in the three-dimensional space;
processing the input to generate processed gesture data;
determining at least one physical attribute of the processed gesture data; and
analyzing the at least one physical attribute of the processed gesture data to determine an interpreted action based upon a spatial relationship of the processed gesture data with respect to the virtual surface and the zone of restriction.

2. The method according to claim 1, wherein the virtual surface is a plane.

3. The method according to claim 1, wherein the at least one physical attribute of the processed gesture data is movement of a human appendage from in back of the virtual surface to in front of the virtual surface and then in back of the virtual surface, wherein the movement occurs within a predetermined time period and the interpreted action is a select.

4. The method according to claim 1, further comprising displaying a cursor as a function of the at least one physical attribute of the processed gesture data.

5. The method according to claim 4, wherein a shape of the cursor is dynamically modified as a function of a distance of a human appendage from the virtual surface.

6. The method according to claim 1, wherein the virtual surface is curved in a manner to compensate for ergonomics of a human body.

7. The method according to claim 1, wherein the at least one physical attribute of the processed gesture data is movement of a human appendage in front of the virtual surface and the interpreted action is a hover.

8. The method according to claim 1, wherein the at least one physical attribute of the processed gesture data is movement of a human appendage in back of the virtual surface and the interpreted action is a drag.

9. The method according to claim 1, wherein the processed gesture data includes clean gesture data.

10. A computer readable storage device storing instructions for human computer interaction, wherein the computer readable storage device is not a transitory signal, the instructions comprising:
defining a virtual surface in three-dimensional space;
defining a zone of restriction as an area or perimeter in X and Y dimensions that is a function of a Z coordinate in a Z dimension that extends in a forward direction from the human, the zone of restriction defining a sensitivity to movements of a human appendage, wherein the sensitivity to movements is reduced as the human appendage is moved forward relative to an origin that is a function of the location of the human;
receiving input generated from a camera regarding the human appendage movement in the three-dimensional space;
processing the input to generate processed gesture data;
determining at least one physical attribute of the processed gesture data, wherein the at least one physical attribute of the processed gesture data comprises the human appendage movement from in back of the virtual surface to in front of the virtual surface and then in back of the virtual surface; and
analyzing the at least one physical attribute of the processed gesture data to determine an interpreted action based upon a spatial relationship of the processed gesture data with respect to the virtual surface and the zone of restriction.

11. The computer readable storage device according to claim 10, wherein the virtual surface is a plane.

12. The computer readable storage device according to claim 10, wherein the at least one physical attribute of the processed gesture data is movement of a human appendage from in back of the virtual surface to in front of the virtual surface and then in back of the virtual surface, wherein the movement occurs within a predetermined time period and the interpreted action is a select.

13. The computer readable storage device according to claim 10, wherein the at least one physical attribute of the processed gesture data is movement of a human appendage in front of the virtual surface and the interpreted action is a hover.

14. The computer readable storage device according to claim 10, wherein the at least one physical attribute of the processed gesture data is movement of a human appendage in back of the virtual surface and the interpreted action is a drag.

15. The computer readable storage device according to claim 10, wherein the processed gesture data includes clean gesture data.

16. A system for analyzing human computer interaction comprising:
a camera, the camera generating a signal as a function of a state of a three dimensional environment;
a gesture engine adapted to:
receive the camera signal; and
process the camera signal to generate a processed gesture signal; and
determine at least one physical attribute of the processed gesture data; and
an action interpretation engine adapted to:
interpret the processed gesture signal as a function of a virtual surface and a zone of restriction, the zone of restriction having an area or perimeter in X and Y dimensions that is a function of a Z coordinate in a Z dimension that extends in a forward direction from the human and defining a sensitivity to movements of a human appendage, wherein the sensitivity to movements is reduced as the human appendage is moved forward relative to an origin that is a function of the location of the human; and
analyze the at least one physical attribute of the processed gesture data to determine an interpreted action based upon a spatial relationship of the processed gesture data with respect to the virtual surface and the zone of restriction.

17. The system according to claim 16, wherein the virtual surface is flat directly in front of a user and curved around at least one side of a user.

18. The system according to claim 16, wherein the processed gesture signal includes a clean gesture signal.

* * * * *